United States Patent
Kobayashi et al.

(10) Patent No.: US 8,475,137 B2
(45) Date of Patent: Jul. 2, 2013

(54) ELECTRIC-MOTOR-DRIVEN OIL PUMP CONTROL SYSTEM

(75) Inventors: Yoshiyuki Kobayashi, Atsugi (JP); Hisatake Ikada, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 295 days.

(21) Appl. No.: 12/884,536

(22) Filed: Sep. 17, 2010

(65) Prior Publication Data
US 2011/0129356 A1 Jun. 2, 2011

(30) Foreign Application Priority Data
Dec. 2, 2009 (JP) ................................ 2009-274023

(51) Int. Cl.
*F04B 49/00* (2006.01)
(52) U.S. Cl.
USPC .............................. 417/44.11; 477/3; 477/906
(58) Field of Classification Search
USPC .................. 417/44.1, 44.11, 2, 3, 426; 477/3, 477/906, 907; 318/34, 35; 180/65.26
See application file for complete search history.

(56) References Cited

U.S. PATENT DOCUMENTS

| 6,799,109 | B2 * | 9/2004 | Nakamori et al. | 701/54 |
|---|---|---|---|---|
| 6,913,558 | B2 * | 7/2005 | Mori et al. | 477/3 |
| 7,137,924 | B2 * | 11/2006 | Ito et al. | 477/3 |
| 7,779,958 | B2 * | 8/2010 | Kitano et al. | 180/339 |
| 2002/0049524 | A1 * | 4/2002 | Wager et al. | 701/41 |
| 2004/0029677 | A1 | 2/2004 | Mori et al. | |
| 2012/0141297 | A1 * | 6/2012 | Jeong et al. | 417/5 |

FOREIGN PATENT DOCUMENTS

| JP | 2004-068732 A | 3/2004 |
|---|---|---|
| JP | 2004-092885 A | 3/2004 |
| JP | 2009-133332 A | 6/2009 |

* cited by examiner

*Primary Examiner* — Devon Kramer
*Assistant Examiner* — Nathan Zollinger
(74) *Attorney, Agent, or Firm* — Foley & Lardner LLP

(57) ABSTRACT

In an electric-motor-driven oil pump unit with automatic engine-stop system interaction, in which an electric-motor-driven oil pump is driven by an electric motor for hydraulic pressure supply to a transmission of an automotive vehicle employing an automatic engine-stop system, at least in a stopped state of a mechanical oil pump driven by the engine, a motor current/speed detector is provided for detecting a motor current and/or a motor speed of the electric motor. Also provided is a controller configured to output an inhibiting signal to the automatic engine-stop system for inhibiting a mode shift to an automatic engine-stop mode, when a change in the motor current and/or the motor speed during a preliminary operation of the electric-motor-driven oil pump executed from a point of time when an automatic engine-stop condition of the vehicle becomes satisfied, is out of a specified characteristic.

16 Claims, 5 Drawing Sheets

ELECTRIC-MOTOR-DRIVEN OIL PUMP CONTROL SYSTEM

TECHNICAL FIELD

The present invention relates to an electric-motor-driven oil pump control system with automatic engine-stop system interaction, and specifically to an electric-motor-driven oil pump control system provided for temporarily supplying working oil to an automatic transmission of an internal-combustion-engine equipped vehicle having a so-called idling-stop function or an automatic engine stop-restart system equipped hybrid vehicle configured to temporarily automatically stop an internal combustion engine during idling without depending on a driver's will.

BACKGROUND ART

In recent years, there have been proposed and developed various idling-stop system equipped vehicles or automatic engine stop-restart system equipped hybrid vehicles for improved fuel economy. Such a system often uses an electric-motor-driven oil pump in order to prevent a drop in hydraulic pressure in an oil supply line connected to an automatic transmission by temporary hydraulic-pressure supply to the transmission by means of the electric-motor-driven oil pump, even when a mechanical oil pump has been kept in its stopped state at an automatic engine-stop mode. When the electric-motor-driven oil pump is unfailed and normally operating, as a matter of course, the transmission can be operated normally by hydraulic pressure discharged from the electric-motor-driven oil pump. On the contrary, when the electric-motor-driven oil pump does not normally discharge hydraulic pressure, the transmission cannot be normally operated.

That is, it is very important to determine whether there is an abnormality in the automatic-transmission hydraulic system containing the electric-motor-driven oil pump as well as the mechanical oil pump. One such abnormality-check system equipped automatic engine stop-restart control system has been disclosed in Japanese Patent Provisional Publication No. 2004-68732 (hereinafter referred to as JP2004-068732), corresponding to U.S. Pat. No. 6,913,558. In the automatic engine stop-restart control system (the electric-motor-driven oil pump system) disclosed in JP2004-068732, under an automatic engine-stop state, as control parameters, a line pressure in a supply line provided for supplying hydraulic pressure from an electric-motor-driven oil pump to an automatic transmission and a motor current of the pump motor are detected. For instance, when the line pressure, detected under an automatic engine-stop state, reduces to below a predetermined pressure value, or when the motor current, detected under an automatic engine-stop state, is outside of a given motor-current range, the automatic engine-stop mode is canceled (disabled or inhibited) and in lieu thereof an automatic engine-restart mode is enabled.

SUMMARY OF THE INVENTION

It is an object of the invention to provide an electric-motor-driven oil pump unit with automatic engine-stop system interaction, which pump unit is configured to ensure a smooth operation of an automatic transmission irrespective of whether the engine is in its automatic engine-stop state (in an idling-stop mode), by optimizing electric-motor-driven oil pump control and engine control just before a mode shift to an idling-stop mode, during the idling-stop mode, and just after a mode shift from the idling-stop mode to an automatic engine-restart mode.

In order to accomplish the aforementioned and other objects of the present invention, an electric-motor-driven oil pump used for supplying working oil to a transmission of an automotive vehicle employing an automatic engine-stop system configured to automatically stop an engine, and driven by an electric motor for hydraulic pressure supply to the transmission, at least in a stopped state of a mechanical oil pump driven by the engine, comprises a motor current detector for detecting a motor current flowing through the electric motor, and a controller configured to output an inhibiting signal to the automatic engine-stop system for inhibiting a mode shift to an automatic engine-stop mode, when a change in a motor current value, detected by the motor current detector during a preliminary operation of the electric-motor-driven oil pump executed from a point of time when an automatic engine-stop condition of the vehicle becomes satisfied, is out of a specified characteristic.

The other objects and features of this invention will become understood from the following description with reference to the accompanying drawings.

DESCRIPTION OF THE PREFERRED EMBODIMENTS

Figure 1:
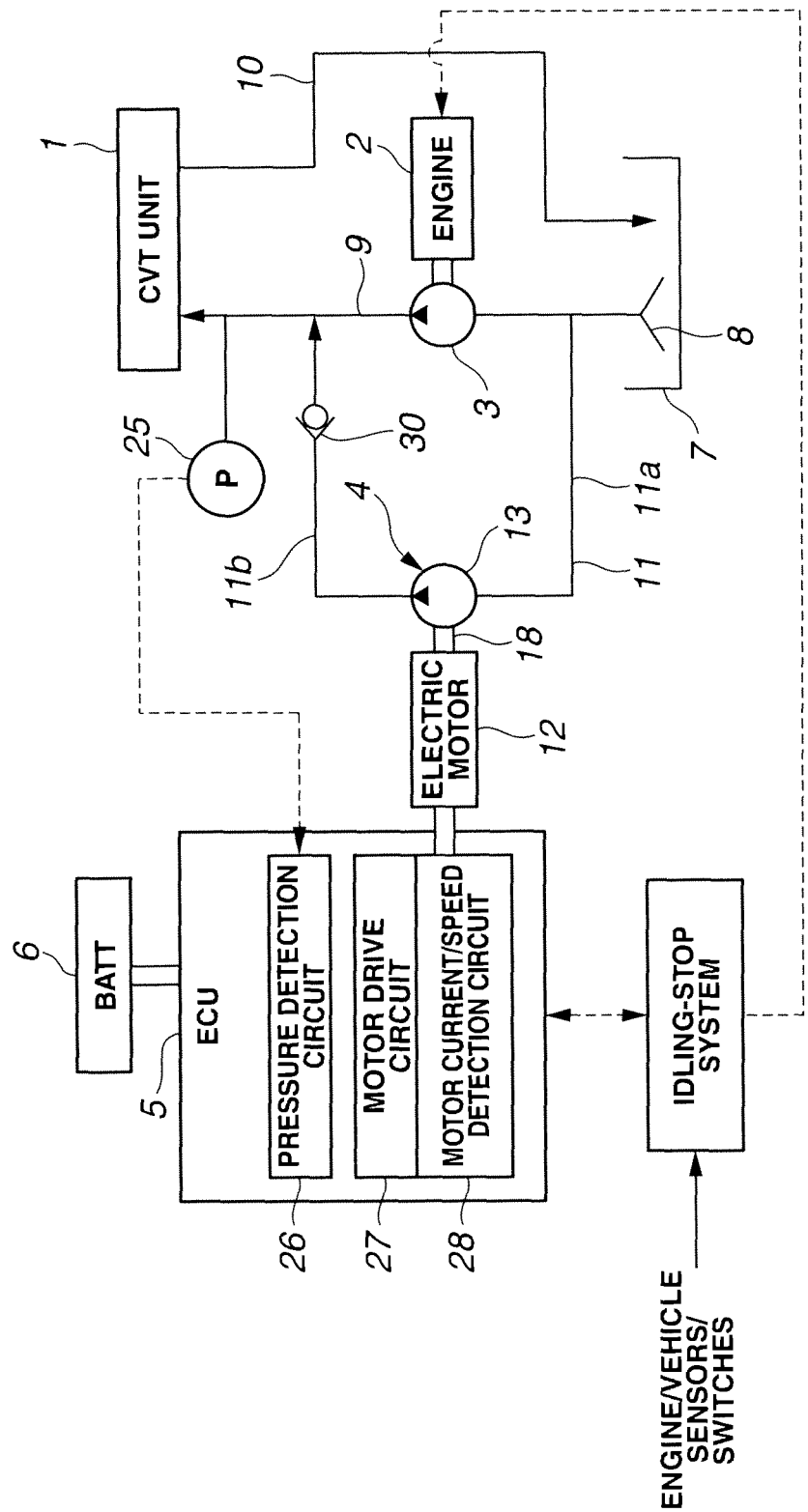
FIG. 1 is a system diagram illustrating an embodiment of an electric-motor-driven oil pump control system with automatic engine-stop system interaction and a hydraulic circuit of a continuously variable automatic transmission (CVT) unit to which the electric-motor-driven oil pump control system of the embodiment is applied.

Referring now to the drawings, particularly to FIG. 1, the electric-motor-driven oil pump control system of the embodiment is exemplified in a hydraulic pressure source for an automatic transmission, such as a continuously variable automatic transmission unit (often abbreviated to "CVT") 1, of an automotive vehicle employing an idling-stop system or a hybrid vehicle employing an automatic engine stop-restart system.

As appreciated from the system diagram of FIG. 1, the automatic transmission (CVT) line pressure control system, to which the electric-motor-driven oil pump control system of the embodiment is applied, includes a main pump (a mechanical oil pump) 3, an electric-motor-driven oil pump (a sub pump) 4, an electronic controller (exactly, an electronic control unit (ECU)) 5, and a battery electric-power source 6. Main pump 3 is configured to be driven by an engine 2 for supplying working oil (hydraulic pressure) to CVT unit 1 in a normal vehicle running state. Electric-motor-driven oil pump 4 is configured to temporarily supply working oil (hydraulic pressure) to CVT unit 1, mainly when the engine 2 has been automatically stopped and thus the main pump 3 has been stopped. Electronic controller 5 is configured to control the operation of electric-motor-driven oil pump 4, and also configured to interact with an automatic engine-stop system, such as an "idling-stop" system, which automatically stops the engine during idling without depending on a driver's will. Details of the interaction between the electric-motor-driven oil pump control system and the automatic engine-stop system are described later in reference to the flowcharts of FIGS. 4 and 6.

Figure 2:
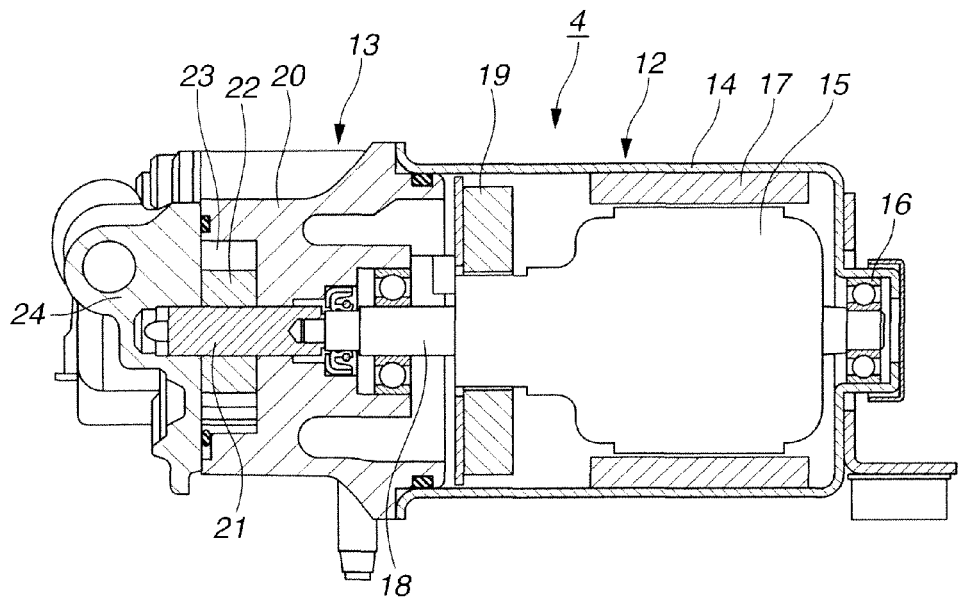
FIG. 2 is a longitudinal cross-section of an electric-motor-driven oil pump device included in the electric-motor-driven oil pump control system of the embodiment.

As appreciated from the longitudinal cross-sectional view of FIG. 2, in the shown embodiment, main pump 3 is constructed by an internal gear rotary pump, such as a trochoid pump. Main pump 3 is configured to suck in working oil stored in an oil pan 7 via an oil strainer 8, and also configured to force-feed the working oil through a supply line 9 to CVT unit 1. A line, denoted by reference sign 10, is a drain line through which working oil is drained or directed from CVT unit 1 to oil pan 7.

Electric-motor-driven oil pump 4 is disposed in a bypass line 11 (serving as a sub-working-oil passage), which line is configured to bypass the main pump 3. Electric-motor-driven oil pump 4 is mainly constructed by an electric motor 12 mounted in an engine room of the vehicle, and a pump subassembly 13 installed on one end (the front end, viewing FIG. 2) of electric motor 12 to provide a pump-and-motor assembly.

As best seen from the cross-section of FIG. 2, electric motor 12 is comprised of a substantially cylindrical motor housing 14, a rotor 15 whose axial end (the right-hand axial end, viewing FIG. 2) is rotatably supported in the motor housing by means of a bearing 15, and a permanent magnet 17 fixed onto the cylindrical inner peripheral wall surface of motor housing 14. The other axial end (the left-hand axial end, viewing FIG. 2) of rotor 15 is formed integral with a motor shaft 18. A stationary brush 19 is installed on the outer periphery of the left-hand axial end of rotor 15, to make sliding electrical contact with the rotor.

Pump subassembly 13 has a pump shaft 21 rotatably installed in a metal pump casing 20 and coaxially-arranged with respect to the axis of motor shaft 18 and fixedly connected to motor shaft 18 in such a manner as to be driven by motor shaft 18. An inner rotor 22 and an outer rotor 23 are operably accommodated in a pump accommodation chamber defined on the front end of pump casing 20 of pump subassembly 13. Inner rotor 22 is fixed onto the outer periphery of pump shaft 21 and has an outer toothed portion. Outer rotor 23 has an inner toothed portion. During operation of the internal gear pump, that is, when inner rotor 22 is driven by the motor shaft (the pump shaft), outer rotor 23 also rotates in the same rotational direction as the inner rotor by mesh between the outer-rotor inner-toothed portion and the inner-rotor outer-toothed portion. Also provided is a pump cover 24 configured to hermetically cover the front end opening of the pump accommodation chamber of pump subassembly 13.

In the shown embodiment, the number of teeth of the internal toothed gear of outer rotor 23 is designed to be greater than the number of teeth of the external toothed gear of inner rotor 22 by "1". Thus, the internal toothed gear of outer rotor 23 and the external toothed gear of inner rotor 22 are meshed with each other, while the axis of inner rotor 22 is eccentric to the axis of outer rotor 23. During rotation of inner and outer rotors 22 and 23, pumping action is made by a change in volumetric capacity in the clearance space (the gaps between the teeth) defined between the inner-rotor external toothed gear and the outer-rotor internal toothed gear. A plurality of variable-volume pumping chambers are defined between the internal toothed gear of outer rotor 23 and the external toothed gear of inner rotor 22.

Although it is not clearly shown in the drawing, a suction chamber is formed in the bottom face of the pump accommodation chamber of pump casing 20 and the inner peripheral wall surface of pump cover 24, and configured to be substantially conformable to the shape of a first group of pumping chambers defining a suction area whose volumetric capacity increases according to rotation of two rotors 22-23 in meshed-engagement. In a similar manner, a discharge chamber (not shown) is formed in the bottom face of the pump accommodation chamber of pump casing 20 and the inner peripheral wall surface of pump cover 24, and configured to be substantially conformable to the shape of a second group of pumping chambers defining a discharge are whose volumetric capacity decreases according to rotation of the two rotors. A suction port is formed in the pump cover 24 for introducing working oil stored in oil pan 7 via the downstream side 11a (serving as an inlet hydraulic line for electric-motor-driven oil pump 4) of bypass line 11 into the suction chamber. A discharge port is also formed in the pump cover 24 for supplying the pressurized working oil discharged from the discharge chamber via the upstream side 11b (serving as an outlet hydraulic line for electric-motor-driven oil pump 4) of bypass line 11 into the supply line 9.

A check valve (a one-way directional control valve) 30 is disposed in the downstream side 11a of bypass line 11, for permitting free flow in one direction (that is, only the working-fluid flow from the discharge port of pump subassembly 13 to supply line 9) and for preventing any flow in the opposite direction (that is, backflow from supply line 9 back to the discharge port of pump subassembly 13).

Controller 5 is electrically connected to electric motor 12 for supplying electricity to electromagnetic coils (not shown) of electric motor 12 so as to rotate the motor shaft 18 together with the rotor 15, thereby driving electric-motor-driven oil pump 13. In more detail, as shown in FIG. 1, controller 5 is also connected to the automatic-engine-stop system (i.e., the idling-stop system) for interaction between the electric-motor-driven oil pump control system and the idling-stop system. Controller 5 generally comprises a microcomputer. Controller 5 includes an input/output interface (I/O), memories (RAM, ROM), and a microprocessor or a central processing unit (CPU). Within controller 5, the central processing unit (CPU) allows the access by the I/O interface of input informational data. The CPU of controller 5 is responsible for carrying the control program stored in memories and is capable of performing necessary arithmetic and logic operations containing an electric-motor-driven oil pump control (in other words, CVT line pressure control) and an engine control (for example, automatic engine-stop mode permission or automatic engine-stop mode inhibition, both described later). Computational results (arithmetic calculation results), that is, calculated output signals are relayed through the output interface circuitry of controller 5 to output stages, namely, electric motor 12, and also outputted to the idling-stop system for engine control. In a similar manner to the configuration of controller 5, the idling-stop system also comprises a microcomputer, and includes an input/output interface (I/O), memories (RAM, ROM), and a microprocessor or a central processing unit (CPU). The input interface of the idling-stop system receives input information from various engine/vehicle switches and sensors, namely a brake switch, a range gear position switch, an accelerator opening sensor, a vehicle speed sensor, an airflow meter, an engine temperature sensor, and the like, for the purpose of automatic engine stop-restart control. Input informational data of the idling-stop system can be extracted by mutual communication between the controller 5 and the idling-stop system. For optimal electric-motor-driven oil pump control and optimal line pressure control for CVT 1 just before a mode shift to an idling-stop mode, during the idling-stop mode, and just after a mode shift from the idling-stop mode to an automatic engine-restart mode, controller 5 is further configured to include a pressure detection circuit (a pressure detector) 26, a motor drive circuit 27, and a motor current/speed detection circuit (a motor current/speed detector) 28. Pressure detection circuit 26 is provided for detecting a line pressure $P_L$ in the supply line 9, based on input information about hydraulic pressure detected by a line-pressure sensor 25 screwed into the supply line 9. Motor drive circuit 27 is provided for outputting a drive current to electric motor 12, and for driving electric-motor-driven oil pump 4. Motor current/speed detection circuit 28 is provided for detecting an electric current supplied to electric motor 12 and a motor speed (a rotational speed of motor shaft 18).

Figure 3:
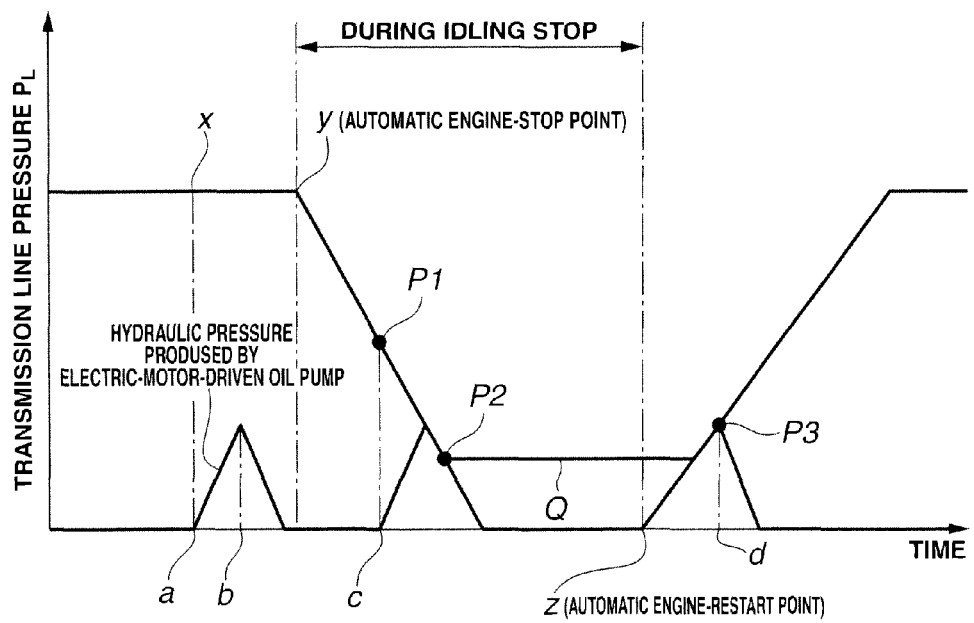
FIG. 3 is a time chart illustrating the relationship between transmission line pressure $P_L$ and electric-motor operation (i.e., preliminary operation (preliminary electric-motor energization), electric-motor re-start (electric-motor re-energization, and electric-motor de-energization), just before a mode shift to an idling-stop mode, during the idling-stop mode, and just after a mode shift from the idling-stop mode to an automatic engine-restart mode.

The operation of the electric-motor-driven oil pump control system of the embodiment is hereunder described in reference to the time chart of FIG. 3, showing the relationship among transmission line pressure $P_L$, the operation of main pump 3 and the operation of electric-motor-driven oil pump 4, just before a mode shift to an idling-stop mode, during the idling-stop mode, and just after a mode shift from the idling-stop mode to an automatic engine-restart mode.

When the engine/vehicle condition becomes shifted toward a stopped state, in other words, when a predetermined automatic engine-stop condition becomes satisfied, for instance, when the vehicle speed becomes less than a given vehicle-speed threshold value such as 10 km/h (see the point "x" on the line-pressure characteristic and the point of time "a" in the time chart of FIG. 3), a preliminary operation of electric-motor-driven oil pump 4 is initiated. During the preliminary operation of electric-motor-driven oil pump 4, a check is made to determine, based on a behavior (a change) of motor current of electric motor 12, whether the functioning of electric-motor-driven oil pump 4 is normal or abnormal. Details of the check for an abnormality in the functioning of electric-motor-driven oil pump 4 are described later in reference to the flowchart of FIG. 6.

Thereafter, at the point of time "b", electric motor 12 becomes de-energized. In this manner, one execution cycle of the preliminary operation of electric-motor-driven oil pump 4 is terminated. Thereafter, at the point "y" on the line-pressure characteristic in the time chart of FIG. 3, the engine is temporarily automatically stopped, only when it is determined that there is no abnormality in the functioning of electric-motor-driven oil pump 4 as a result of the preliminary operation.

From the automatic engine-stop point "y", the hydraulic pressure produced by main pump 3 begins to drop. In order to prevent an excessive drop in line pressure $P_L$ in supply line 9 during switching from a main hydraulic-pressure source (i.e., main pump 3) to a sub-hydraulic-pressure source (i.e., electric-motor-driven oil pump 4), another check is made, based on information about line pressure $P_L$ detected by line-pressure sensor 25, whether line pressure $P_L$, gradually dropping, reduces to below a first threshold value P1. Immediately when line pressure $P_L$, gradually dropping due to main pump 3 in its stopped state, reaches the first threshold value P1 (see the point of time "c"), electric motor 12 becomes reenergized (restarted). By virtue of the re-energization of electric motor 12, line pressure $P_L$ in supply line 9 tends to be held at a substantially constant pressure level (see the horizontal line "Q" indicating a constant pressure level) from the point of time when line pressure $P_L$ drops to a second threshold value P2.

Thereafter, at the point of time "z", suppose that the brakes of the vehicle are released and thus the engine is automatically restarted. Thus, in addition to the hydraulic pressure produced by electric-motor-driven oil pump 4, a hydraulic pressure, produced by main pump 3, begins to rise from the automatic engine-restart point "z". As a result of this, line pressure $P_L$ in supply line 9 begins to further rise from the pressure level indicated by the horizontal line "Q". Immediately when line pressure $P_L$, further rising from the pressure level indicated by the horizontal line "Q", reaches a third threshold value P3 lower than the first threshold value P1 and higher than the second threshold value P2, at the point of time "d", electric motor 12 becomes de-energized and thus electric-motor-driven oil pump 4 becomes inoperative.

By virtue of the previously-discussed line pressure control, line pressure $P_L$ can be held at a pressure level higher than or equal to the second threshold value P2, even during the idling-stop mode, thus ensuring a smooth operation of CVT unit 1, just before a mode shift to the idling-stop mode, during the idling-stop mode, and just after a mode shift from the idling-stop mode to an automatic engine-restart mode.

In the shown embodiment, the timing (see the electric-motor-restart point "c" in FIG. 3), at which electric motor 12 is reenergized (restarted) after the automatic engine-stop point "y" for the purpose of a main operation of electric-motor-driven oil pump 4 during the idling-stop mode, and the timing (see the electric-motor-deenergization point "d" in FIG. 3), at which electric motor 12 is de-energized after the automatic engine-restart point "z", are both based on comparison between the detected line pressure $P_L$ and a threshold value (e.g., first threshold value P1 or third threshold value P3). In lieu thereof, the timing, at which electric motor 12 is reenergized (restarted) after the automatic engine-stop point "y", may be determined based on a length of time, elapsed from the automatic engine-stop point "y", and the timing, at which electric motor 12 is de-energized after the automatic engine-restart point "z", may be determined based on a length of time, elapsed from the automatic engine-restart point "z". Additionally, the above-mentioned timings may be varied depending on an oil temperature of working oil to be supplied to CVT unit 1.

Figure 4:
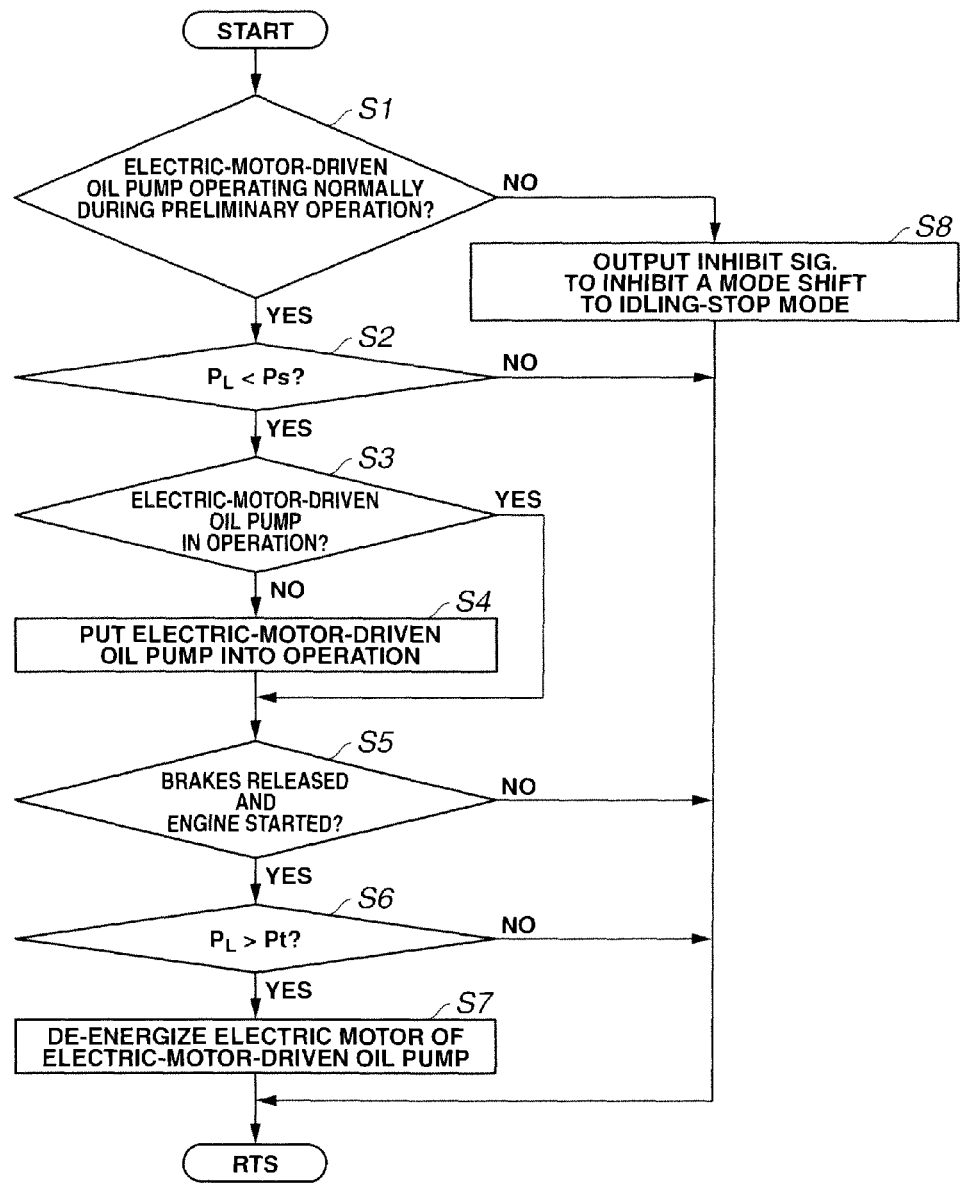
FIG. 4 is a flowchart illustrating a control flow executed within an electronic controller incorporated in the electric-motor-driven oil pump control system of the embodiment, just before a mode shift to an idling-stop mode, during the idling-stop mode, and just after a mode shift from the idling-stop mode to an automatic engine-restart mode.

The control routine, executed within controller 5, just before a mode shift to an idling-stop mode, during the idling-stop mode, and just after a mode shift from the idling-stop mode to an automatic engine-restart mode, is hereunder described in detail in reference to the flowchart of FIG. 4. The routine of FIG. 4 is executed as time-triggered interrupt routines to be triggered every predetermined sampling time intervals such as 10 milliseconds.

At step S1, a check is made to determine, based on a behavior (a change) of the detected motor current, whether a preliminary operation of electric-motor-driven oil pump 4 is normal or abnormal. In other words, a check is made to determine, based on a behavior (a change) of the detected motor current, whether there is no abnormality in the functioning of electric-motor-driven oil pump 4 during execution of the preliminary operation just before a mode shift to an idling-stop mode. For instance, when it is determined that the preliminary operation is not performed normally owing to a failure in electric motor 12, such as breaking of a wiring harness of electric motor 12, that is, when the answer to step S1 is in the negative (NO), the routine proceeds to step S8. At step S8, controller 5 generates an INHIBIT signal (an INHIBITING signal), used to inhibit a mode shift to an automatic engine-stop mode (an idling-stop mode), to the idling-stop system, so as to drive or operate the engine continuously.

Conversely when the answer to step S1 is in the affirmative (YES), that is, when it is determined that the preliminary operation is performed normally, the routine proceeds to step S2.

At step S2, a check is made to determine whether line pressure $P_L$ in supply line 9 is lower than a predetermined pressure value Ps (corresponding to first threshold value P1). When the answer to step S2 is negative (NO), that is, when line pressure $P_L$ is higher than or equal to the predetermined pressure value Ps, i.e., $P_L \geq Ps$, the discharge pressure of working oil, discharged from main pump 3, is still high, and thus one execution cycle terminates. Conversely when the answer to step S2 is affirmative (YES), that is, when line pressure $P_L$ is lower than the predetermined pressure value Ps, i.e., $P_L < Ps$, the routine proceeds to step S3.

At step S3, a check is made to determine whether electric-motor-driven oil pump 4 is operating now. When the answer to step S3 is affirmative (YES), that is, when electric-motor-driven oil pump 4 is kept in its operative state, the routine jumps to step S5. Conversely when the answer to step S3 is negative (NO), that is, when electric-motor-driven oil pump 4 is kept in its inoperative state, the routine proceeds to step S4.

At step S4, electric motor 12 becomes energized so as to put electric-motor-driven oil pump 4 into operation.

At step S5, a check is made to determine whether the brakes have been released and the engine has been restarted. When the answer to step S5 is affirmative (YES), that is, when the brakes have been released and the engine has been restarted, the routine proceeds to step S6. Conversely when the answer to step S5 is negative (NO), one execution cycle terminates.

At step S6, a check is made to determine whether line pressure $P_L$ in supply line 9 is higher than a predetermined pressure value Pt (corresponding to third threshold value P3). When the answer to step S6 is negative (NO), that is, when line pressure $P_L$ is lower than or equal to the predetermined pressure value Pt, i.e., $P_L \leq Pt$, one execution cycle terminates. Conversely when the answer to step S6 is affirmative (YES), that is, when line pressure $P_L$ is higher than the predetermined pressure value Pt, i.e., $P_L > Pt$, the routine proceeds to step S7.

At step S7, electric motor 12 becomes de-energized and thus the electric-motor-driven oil pump 4 becomes inoperative.

Figure 5:
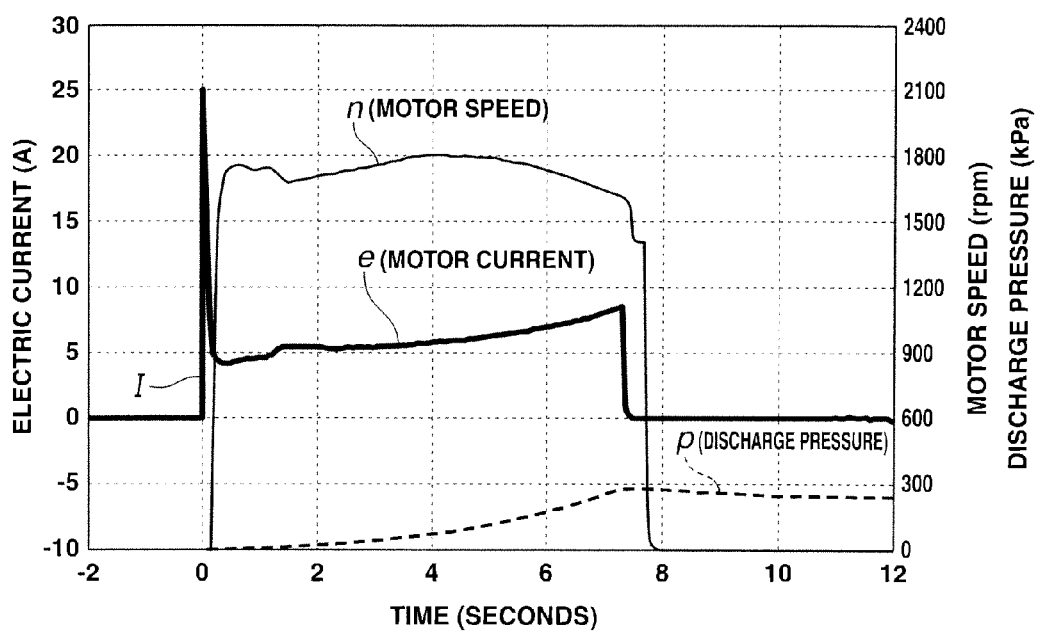
FIG. 5 is a characteristic diagram illustrating the relationship among electric motor current, electric motor speed, and discharge pressure of the electric-motor-driven oil pump during one execution cycle of the preliminary operation.

A method to determine the presence or absence of an abnormality in the functioning of electric-motor-driven oil pump 4 as a result of the preliminary operation executed immediately before a mode shift to an idling-stop mode, is hereunder described in detail in reference to the characteristic diagram of FIG. 5.

Actually, a check for the presence or absence of an abnormality in the functioning of electric-motor-driven oil pump 4 is made on the basis of a behavior (a change) of the detected motor current value I of electric motor 12.

The characteristic curve indicated by the heavy solid line "e" in FIG. 5 shows a motor-current behavior, obtained when electric-motor-driven oil pump 4 is operating normally during the preliminary operation.

As can be seen from the motor-current characteristic curve "e" of FIG. 5, when electric motor 12 of electric-motor-driven oil pump 4 becomes energized, the motor current begins to rapidly rise from zero, and continuously rises up to an over-current flowing through electric motor 12 as conditioned in its locked state.

Thereafter, electric-motor-driven oil pump 4 begins to rotate with a slight time lag and then the function of power-generation of electric motor 12 starts. At this time, the motor current value I turns to a drop, but air stays in the pumping chambers and thus electric motor 12 rotates with a less load due to a less resistance to driving of the pump. Thus, as can be seen from the motor-speed characteristic curve "n" indicated by the fine solid line in FIG. 5, with the slight time lag, the motor speed rapidly rises, whereas the motor current value I rapidly drops.

After this, air in the pumping chambers comes out of the pumping chambers, while working oil enters the pumping chambers. In this manner, electric-motor-driven oil pump 4 begins to discharge working oil. As can be seen from the discharge-pressure characteristic curve "p" indicated by the dotted line in FIG. 5, the discharge pressure gradually rises, and further rises and reaches a substantially constant pressure level at the last stage of the preliminary operation. During the discharge pressure rise (i.e., during the middle stage of the preliminary operation), due to an increased resistance to driving of the pump, on the one hand, the motor speed (see the motor-speed characteristic curve "n") tends to gradually drop, and, on the other hand, the motor current (see the motor-current characteristic curve "e") tends to gradually rise. In this manner, if electric-motor-driven oil pump 4 is operating normally, the detected motor current value I exhibits the specified motor-current behavior as described previously.

In the shown embodiment, motor current/speed detection circuit 28 detects or monitors the motor-current behavior (the motor-current change) during the preliminary operation. In the presence of a specified motor-current behavior that, for a brief moment immediately after energization of electric motor 12 the motor current value I exceeds a certain current value (close to an overcurrent flowing through electric motor 12 as conditioned in its locked state) due to a rapid motor-current rise and then turns to a drop, and thereafter for a certain period of time the motor current value I rises again, controller 5 determines that the operation of electric-motor-driven oil pump 4 is normal. The above-mentioned term "overcurrent" is hereinafter referred to as "lock-current". The specified motor-current change characteristic with respect to time, obtained during preliminary operation of the unfailed (normal) electric-motor-driven oil pump 4, exhibits an almost same motor-current-change tendency, but somewhat varies depending on an oil temperature of working oil to be supplied to CVT unit 1 or an engine oil temperature. In more detail, a first time-length threshold value Ts (described later in reference to the flow chart of FIG. 6) for the time, elapsed from the starting point of the preliminary operation, under a condition where the motor current value I remains low due to a failure in electric motor 12 such as breaking of a wiring harness of the electric motor, a second time-length threshold value Tr (described later in reference to the flow chart of FIG. 6) for the time, elapsed from the time when the motor current value I exceeds a predetermined high current value Ir (close to the lock-current), under a condition where the motor current value I remains high due to either electric motor 12 or pump subassembly 13 kept in a locked state, and a third time-length threshold value Td (described later in reference to the flow chart of FIG. 6) for the time, elapsed from the time when the motor current value I has turned to a drop, under a condition where the motor current value I rises from zero to a high current value once and then turns to a drop, and thereafter never rises again due to breaking of the jointed portion between motor shaft 18 and pump shaft 21, may be varied depending on an oil temperature.

Examples for determining the presence of an abnormality in the functioning of electric-motor-driven oil pump 4 as a result of the preliminary operation are hereunder described in detail.

For instance, in the presence of breaking of a wire harness of electric motor 12 or a contact failure in terminals of electric motor 12, there is a less electric current flowing through electric motor 12 and thus the motor current value I remains low.

When either electric motor 12 or pump subassembly 13 is in a locked state owing to some kinds of causes, an overcurrent (a lock-current) tends to continuously flow through electric motor 12. Thus, the motor current value I rapidly rises up to a lock-current immediately after energization of electric motor 12, but never turns to a drop. That is to say, the motor current value I remains kept substantially at the lock-current after energization of electric motor 12. In such a case, controller 5 determines that there is an abnormality in the functioning of electric-motor-driven oil pump 4.

When the jointed portion of motor shaft 18 of electric motor 12 and pump shaft 21 of pump subassembly 13 is failed (broken) and thus electric motor 12 rotates with a less load, an excess current tends to flow through electric motor 12 so that the motor current value I reaches an excessively high current (i.e., a lock-current). Thereafter, the motor current value I turns to a drop, but there is a less rise in the load on electric motor 12, since there is no working fluid discharged from the pump subassembly 13. Hence, the motor current value I cannot rise again. In such a case, controller 5 determines that there is an abnormality in the functioning of electric-motor-driven oil pump 4.

By introducing a preliminary operation of electric-motor-driven oil pump 4 just before a mode shift to an automatic engine-stop mode, working oil has already been pre-charged into the pumping chambers of oil pump 4 at the point of time (see the electric-motor-restart point "c" in FIG. 3) when electric motor 12 is reenergized (restarted) after the engine has been temporarily automatically stopped. This contributes to a quick development of discharge pressure of working oil discharged from electric-motor-driven oil pump 4 immediately after reenergization of electric motor 12. Thus, there is a less risk of a temporary drop in transmission line pressure $P_L$, even during switching between a main hydraulic-pressure source (i.e., main pump 3) and a sub-hydraulic-pressure source (i.e., electric-motor-driven oil pump 4). Additionally, the system of the embodiment is designed or configured such that the arithmetic/logic operation for determining the presence or absence of an abnormality in the functioning of electric-motor-driven oil pump 4 by the introduction of preliminary operation of oil pump 4, cannot be executed during a period of time from the time (see the electric-motor-deenergization point "d" in FIG. 3) when electric motor 12 is de-energized to the time when working oil in the pumping chambers comes out of the pumping chambers. In other words, even when a vehicle speed becomes less than a given vehicle-speed threshold value such as 10 km/h, the system of the embodiment is configured not to execute preliminary operation of oil pump 4 until the time elapsed from the electric-motor-deenergization point "d" exceeds a given time length during which more of working oil in the pumping chambers can be replaced with air. Hence, when electric-motor-driven oil pump 4 is operating normally, the detected motor current value I always exhibits the specified motor-current behavior (see the motor-current characteristic curve indicated by the heavy solid line "e" in FIG. 5) as described previously.

Figure 6:
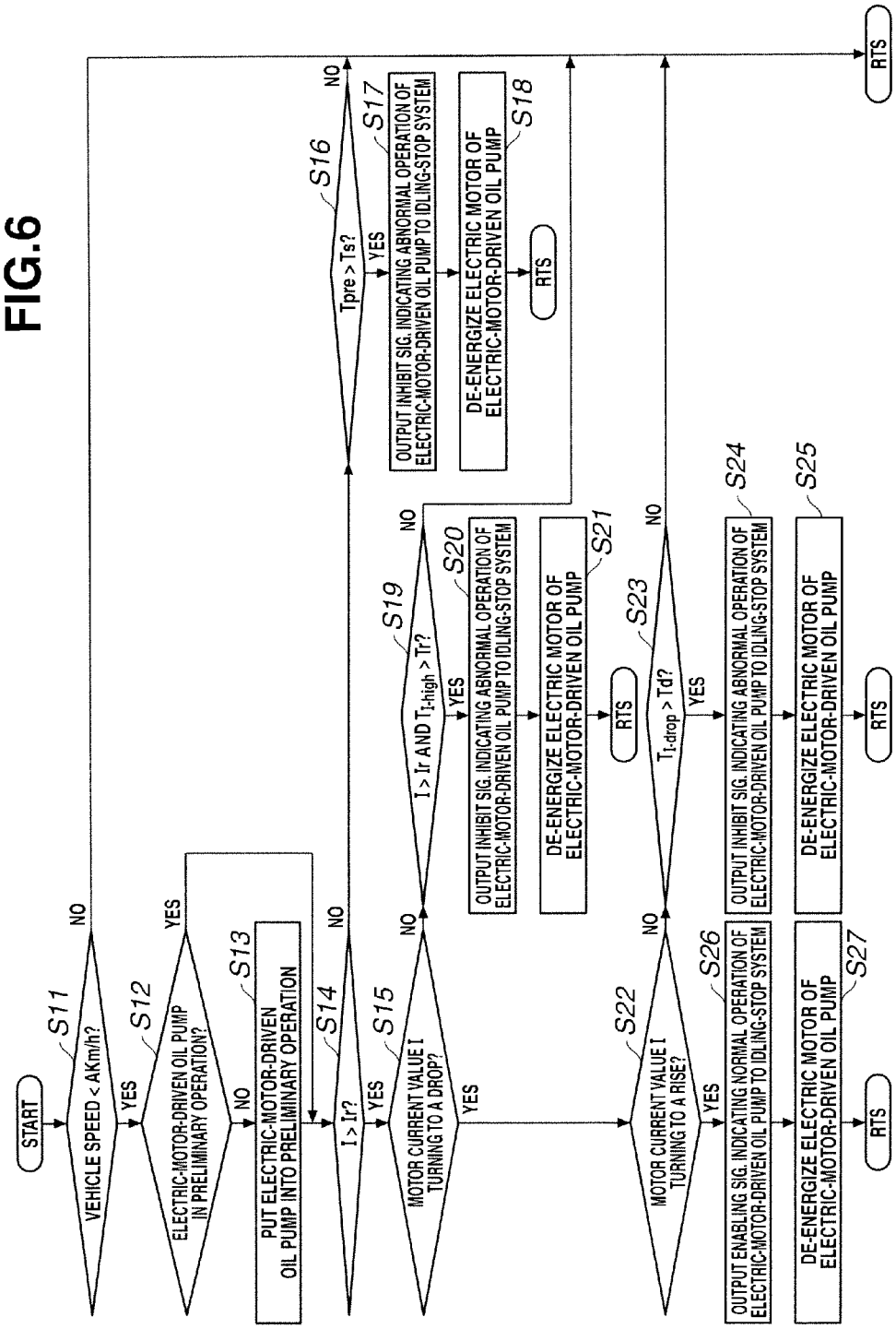
FIG. 6 is a flowchart illustrating a control flow executed within the electronic controller, for determining, based on a behavior (a change) of electric motor current, the presence or absence of an abnormality in the functioning of electric-motor-driven oil pump 4, by the introduction of the preliminary operation.

Referring now to FIG. 6, there is shown the control routine executed within controller 5, for determining, based on a behavior (a change) of electric motor current, the presence or absence of an abnormality in the functioning of electric-motor-driven oil pump 4, by the introduction of the preliminary operation. The routine of FIG. 6 is also executed as time-triggered interrupt routines to be triggered every predetermined sampling time intervals.

At step S11, a check is made to determine whether the engine/vehicle condition becomes shifted toward a stopped state, in other words, when a predetermined automatic engine-stop condition becomes satisfied, more concretely, when a vehicle speed, obtained at the current execution cycle, becomes less than or equal to a given vehicle-speed threshold value "A" such as 10 km/h. When the answer to step S11 is negative (NO), one execution cycle terminates. Conversely when the answer to step S11 is affirmative (YES), the routine proceeds to step S12.

At step S12, a check is made to determine whether electric-motor-driven oil pump 4 is preliminarily operated (driven). When the answer to step S12 is affirmative (YES), that is, when electric-motor-driven oil pump 4 is in preliminary operation, the routine jumps to step S14. Conversely when the answer to step S12 is negative (NO), that is, when electric-motor-driven oil pump 4 has not yet been put into preliminary operation, the routine proceeds to step S13.

At step S13, electric motor 12 becomes energized, such that electric-motor-driven oil pump 4 comes into preliminary operation.

At step S14, a check is made to determine whether the motor current value I exceeds a predetermined current value Ir (close to the lock-current value). When the answer to step S14 is affirmative (YES), that is, I>Ir, the routine proceeds to step S15. Conversely when the answer to step S14 is negative (NO), that is, I≦Ir, the routine proceeds to step S16.

At step S16, a check is made to determine whether the time (hereinafter referred to as "preliminary-operation time duration Tpre") elapsed from the starting point of the preliminary operation is longer than the first time-length threshold value Ts. When the answer to step S16 is negative (NO), that is, Tpre≦Ts, one execution cycle terminates. Conversely when the answer to step S16 is affirmative (YES), that is, Tpre>Ts, the routine proceeds to step S17.

At step S17, controller 5 determines that there is an abnormality in the functioning of electric-motor-driven oil pump 4, and simultaneously outputs an INHIBIT signal indicating abnormal operation of electric-motor-driven oil pump 4 to the idling-stop system, and whereby a mode shift to an automatic engine-stop mode (an idling-stop mode) is inhibited and the engine is continuously operated. After step S17, step S18 occurs.

At step S18, electric motor 12 becomes de-energized and thus the preliminary operation of electric-motor-driven oil pump 4 ends.

On the other hand, at step S15, a check is made to determine whether the motor current value I turns to a drop. When the answer to step S15 is negative (NO), that is, when the motor current value I has not yet turned to a drop, the routine proceeds to step S19.

At step S19, a check is made to determine whether the motor current value I is continuously kept above the predetermined current value Ir, and the time (hereinafter referred to as "energization time duration $T_{I\text{-}high}$"), elapsed from the time when the motor current value I exceeds the predetermined current value Ir, is longer than the second time-length threshold value Tr. When the answer to step S19 is negative (NO), one execution cycle terminates. Conversely when the answer to step S19 is affirmative (YES), in the case of I>Ir and $T_{I\text{-}high}$>Tr, the routine proceeds from step S19 to step S20.

At step S20, controller 5 determines that there is an abnormality in the functioning of electric-motor-driven oil pump 4, and simultaneously outputs an INHIBIT signal indicating abnormal operation of electric-motor-driven oil pump 4 to the idling-stop system, and whereby a mode shift to an automatic engine-stop mode (an idling-stop mode) is inhibited and the engine is continuously operated. After step S20, step S21 occurs.

At step S21, electric motor 12 becomes de-energized and thus the preliminary operation of electric-motor-driven oil pump 4 ends.

Returning to step S15, in contrast, when the answer to step S15 is affirmative (YES), that is, when the motor current value I has turned to a drop, the routine proceeds to step S22.

At step S22, a check is made to determine whether the motor current value I turns to a rise. When the answer to step S22 is negative (NO), that is, when the motor current value I has not yet turned to a rise, the routine proceeds to step S23

At step S23, a check is made to determine whether the time (hereinafter referred to as "current-drop time duration $T_{I\text{-}drop}$") elapsed from the time when the motor current value I has turned to a drop, is longer than the time-length threshold value Td. When the answer to step S23 is negative (NO), that is, $T_{I\text{-}drop} \leq Td$, one execution cycle terminates. Conversely when the answer to step S23 is affirmative (YES), that is, $T_{I\text{-}drop}$>Td, the routine proceeds from step S23 to step S24.

At step S24, controller 5 determines that there is an abnormality in the functioning of electric-motor-driven oil pump 4, and simultaneously outputs an INHIBIT signal indicating abnormal operation of electric-motor-driven oil pump 4 to the idling-stop system, and whereby a mode shift to an automatic engine-stop mode (an idling-stop mode) is inhibited and the engine is continuously operated. After step S24, step S25 occurs.

At step S25, electric motor 12 becomes de-energized and thus the preliminary operation of electric-motor-driven oil pump 4 ends.

Returning to step S22, in contrast, when the answer to step S22 is affirmative (YES), that is, when the motor current value I has turned to a rise, the routine proceeds to step S26.

At step S26, controller 5 determines that there is no abnormality in the functioning of electric-motor-driven oil pump 4, and simultaneously outputs an ENABLING signal indicating normal operation of electric-motor-driven oil pump 4 to the idling-stop system, and whereby a mode shift to an automatic engine-stop mode (an idling-stop mode) is enabled (permitted) and thus the engine is temporarily automatically stopped. After step S26, step S27 occurs.

At step S27, electric motor 12 becomes de-energized and thus the preliminary operation of electric-motor-driven oil pump 4 ends.

As will be appreciated from the above, according to the electric-motor-driven oil pump control system of the embodiment, by virtue of preliminary operation of electric-motor-driven oil pump 4 executed just before a mode shift to an automatic engine-stop mode (an idling-stop mode), it is possible to check for the presence or absence of an abnormality in the functioning of electric-motor-driven oil pump 4 in advance. In the presence of an abnormality in the functioning of pump 4, controller 5 outputs an INHIBIT signal to the idling-stop system so as to inhibit (disable) a mode shift to an idling-stop mode, and to operate the engine continuously and thus to continuously drive a main hydraulic-pressure source (i.e., main pump 3). In contrast, in the absence of an abnormality in the functioning of pump 4, controller 5 outputs an ENABLING signal to the idling-stop system so as to enable (permit) to a mode shift to an idling-stop mode, and to enable smooth switching from a main hydraulic-pressure source (i.e., main pump 3) to a sub-hydraulic-pressure source (i.e., electric-motor-driven oil pump 4). Therefore, it is possible to ensure a smooth operation of CVT unit 1, by optimal line pressure control just before a mode shift to the idling-stop mode, during the idling-stop mode, and just after a mode shift from the idling-stop mode to an automatic engine-restart mode.

Additionally, by virtue of the pre-charging action of working oil into the pumping chambers of electric-motor-driven oil pump 4, caused by the preliminary operation executed just before a mode shift to an automatic engine-stop mode, it is possible to realize a quick rise of discharge pressure of working oil discharged from pump 4 even at the beginning of the main operation of pump 4 executed after an automatic engine-stop point (see the point "y" in FIG. 3).

Furthermore, electric motor 12 becomes de-energized once at the end of the preliminary operation of electric-motor-driven oil pump 4 (see the point of time "b" in FIG. 3). Thus, it is possible to reduce an energy consumption rate.

Moreover, in the system of the shown embodiment, the operation of electric-motor-driven oil pump 4 (that is, (i) the timing of main operation of oil pump 4 (the timing of re-energization of electric motor 12) during an idling-stop mode) and (ii) the timing of switching of oil pump 4 from operative to inoperative (the timing of de-energization of electric motor 12) just after a mode shift from the idling-stop mode to an automatic engine-restart mode) is accurately controlled responsively to line pressure $P_L$, detected by line pressure sensor 25. Thus, it is unnecessary to relieve surplus working oil from electric-motor-driven oil pump 4. This eliminates the necessity of a relief valve to be disposed between supply line 9 and oil pump 4, and also eliminates the necessity of an additional pressure sensor to be disposed in the upstream side 11b (serving as an outlet hydraulic line for electric-motor-driven oil pump 4) of bypass line 11. This contributes to reduced number of fittings to connect hydraulic lines between various components in a hydraulic system, reduced oil leakages and contamination due to fewer fittings, lower system installation time and costs, and smaller space requirements of overall system.

In the system of the embodiment, when a vehicle speed becomes less than or equal to a given threshold value "A" such as 10 km/h, preliminary operation of electric-motor-driven oil pump 4 is initiated once. It will be understood that the number of preliminary operation of electric-motor-driven oil pump 4 is not limited to "once". In lieu thereof, two or more preliminary operations may be executed every predetermined time intervals for a period of time from the time when the vehicle speed becomes less than or equal to a given threshold value "A", such as 10 km/h, to the time when the engine becomes temporarily automatically stopped, for the purpose of avoiding working oil in the pumping chambers from coming out of the pumping chambers of pump subassembly 13. In such a case, it is possible to prevent the engine from being automatically stopped under a specific condition where more of working oil in the pumping chambers has already been replaced by air.

The electric-motor-driven oil pump control system of the embodiment is applied to electric-motor-driven oil pump 4 serving as a sub-hydraulic-pressure source for an automatic transmission, such as a continuously variable automatic transmission unit 1. In lieu thereof, the electric-motor-driven oil pump control system of the embodiment, may be applied to an electric-motor-driven oil pump serving as a sub-hydraulic-pressure source for power steering devices used in automotive vehicles.

In the shown embodiment, electronic controller 5 and electric motor 12 are configured separately from each other. In lieu thereof, electronic controller 5 may be configured to be integrally connected to electric motor 12, such that electronic controller 5 is installed in the interior space of electric motor 12 and that electric-motor-driven oil pump 4 and electronic controller 5 containing the pressure detection circuit 26 and motor drive circuit 27 and motor current/speed detection circuit 28 are integrally configured as an electric-motor-driven oil pump unit. Also, in the shown embodiment, as the electric motor 12, a direct-current (DC) brush motor is used. In lieu thereof, a brushless motor may be used as an electric motor.

In the shown embodiment, during preliminary operation of electric-motor-driven oil pump 4, a check is made to determine, based on a behavior (a change) of motor current (see the characteristic curve "e" in FIG. 5) of electric motor 12, whether the functioning of electric-motor-driven oil pump 4 is normal or abnormal. In lieu thereof, a check for the presence or absence of an abnormality in the functioning of electric-motor-driven oil pump 4 during preliminary operation may be made based on a behavior of motor speed (see the characteristic curve "n" in FIG. 5) of electric motor 12. That is, as a control parameter, information about motor current from motor current/speed detector 28 may be replaced with information about motor speed. In order to more precisely determine whether the functioning of electric-motor-driven oil pump 4 is normal or abnormal during preliminary operation, information about motor speed as well as information about motor current may be utilized. In such a case, electronic controller 5 outputs an INHIBIT signal to the automatic engine-stop system (the idling-stop system) for inhibiting a mode shift to an automatic engine-stop mode, when the detected motor speed is kept at a substantially zero speed value less than a predetermined lower speed limit continuously during the preliminary operation or when the detected motor speed is kept at an excessively high speed value exceeding a predetermined upper speed limit continuously during the preliminary operation.

The entire contents of Japanese Patent Application No. 2009-274023 (filed Dec. 2, 2009) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electric-motor-driven oil pump used for supplying working oil through a sub-working-oil passage to a transmission of an automotive vehicle employing an automatic engine-stop system configured to automatically stop an engine, and driven by an electric motor for hydraulic pressure supply from the sub-working-oil passage through a check valve to the transmission, at least when hydraulic pressure supplied to the transmission is dropping under a stopped state of a mechanical oil pump driven by the engine, comprising:
 a motor current detector for detecting a motor current flowing through the electric motor; and
 a controller configured to temporarily execute a preliminary operation of the electric-motor-driven oil pump when a length of time, elapsed from a point of time when the electric motor becomes stopped, exceeds a predetermined time length and a vehicle speed becomes less than a given vehicle-speed threshold value, the controller further configured to output an enabling signal to the automatic engine-stop system for permitting a mode shift to an automatic engine-stop mode when a motor current value, detected by the motor current detector during the preliminary operation, rises from zero to a high current value once and then turns to a drop, and thereafter rises again, and the controller still further configured to output an inhibiting signal to the automatic engine-stop system for inhibiting a mode shift to an automatic engine-stop mode when the motor current value, detected by the motor current detector during the preliminary operation, is continuously kept high or continuously kept low.

2. The electric-motor-driven oil pump as claimed in claim 1, wherein:
 the preliminary operation is executed only for a given execution time, and terminated upon expiration of the given execution time.

3. The electric-motor-driven oil pump as claimed in claim 1, wherein:
 the preliminary operation is terminated after the motor current value, detected by the motor current detector during the preliminary operation, has risen from zero to a high current value once and then turned to a drop, and thereafter has risen again.

4. The electric-motor-driven oil pump as claimed in claim 1, wherein:
 after the preliminary operation, a main operation of the electric-motor-driven oil pump is executed depending on a line pressure of working oil supplied to the transmission.

5. The electric-motor-driven oil pump as claimed in claim 4, wherein:
 the main operation of the electric-motor-driven oil pump is initiated, when the line pressure reduces to below a first threshold value under a condition where the mode shift to the automatic engine-stop mode has been permitted after the preliminary operation.

6. The electric-motor-driven oil pump as claimed in claim 5, wherein:
 after the preliminary operation, the main operation of the electric-motor-driven oil pump is initiated when the line pressure reduces to below the first threshold value, and continuously executed in such a manner as to maintain a pressure level corresponding to a second threshold value lower than the first threshold value, and thereafter terminated when the line pressure reaches a pressure level corresponding to a third threshold value lower than the first threshold value and higher than the second threshold value.

7. The electric-motor-driven oil pump as claimed in claim 1, wherein:
 a subsequent execution cycle of preliminary operation is initiated, when there is no occurrence of the mode shift to the automatic engine-stop mode upon expiration of a given period of time after one execution cycle of the preliminary operation.

8. The electric-motor-driven oil pump as claimed in claim 1, wherein:
the electric motor comprises a direct-current brush motor.

9. An electric-motor-driven oil pump control system with automatic engine-stop system interaction, comprising:
an electric-motor-driven oil pump used for supplying working oil through a sub-working-oil passage to a transmission of an automotive vehicle employing an automatic engine-stop system configured to automatically stop an engine, and driven by an electric motor for hydraulic pressure supply from the sub-working-oil passage through a check valve to the transmission, at least when hydraulic pressure supplied to the transmission is dropping under a stopped state of a mechanical oil pump driven by the engine;
a motor current detector for detecting a motor current flowing through the electric motor; and
a controller configured to temporarily execute a preliminary operation of the electric-motor-driven oil pump when a length of time, elapsed from a point of time when the electric motor becomes stopped, exceeds a predetermined time length and a vehicle speed becomes less than a given vehicle-speed threshold value, the controller further configured to output an enabling signal to the automatic engine-stop system for permitting a mode shift to an automatic engine-stop mode when a motor current value, detected by the motor current detector during the preliminary operation, rises from zero to a high current value once and then turns to a drop, and thereafter rises again, and the controller still further configured to output an inhibiting signal to the automatic engine-stop system for inhibiting a mode shift to an automatic engine-stop mode when the motor current value, detected by the motor current detector during the preliminary operation, is continuously kept high or continuously kept low.

10. The electric-motor-driven oil pump control system as claimed in claim 9, wherein:
the preliminary operation is executed only for a given execution time, and terminated upon expiration of the given execution time.

11. The electric-motor-driven oil pump control system as claimed in claim 9, wherein:
the preliminary operation is terminated after the motor current value, detected by the motor current detector during the preliminary operation, has risen from zero to a high current value once and then turned to a drop, and thereafter has risen again.

12. The electric-motor-driven oil pump control system as claimed in claim 9, wherein:
after the preliminary operation, a main operation of the electric-motor-driven oil pump is executed depending on a line pressure of working oil supplied to the transmission.

13. The electric-motor-driven oil pump control system as claimed in claim 12, wherein:
the main operation of the electric-motor-driven oil pump is initiated, when the line pressure reduces to below a first threshold value under a condition where the mode shift to the automatic engine-stop mode has been permitted after the preliminary operation.

14. The electric-motor-driven oil pump control system as claimed in claim 13, wherein:
after the preliminary operation, the main operation of the electric-motor-driven oil pump is initiated when the line pressure reduces to below the first threshold value, and continuously executed in such a manner as to maintain a pressure level corresponding to a second threshold value lower than the first threshold value, and thereafter terminated when the line pressure reaches a pressure level corresponding to a third threshold value lower than the first threshold value and higher than the second threshold value.

15. The electric-motor-driven oil pump control system as claimed in claim 9, wherein:
a subsequent execution cycle of preliminary operation is initiated, when there is no occurrence of the mode shift to the automatic engine-stop mode upon expiration of a given period of time after one execution cycle of the preliminary operation.

16. The electric-motor-driven oil pump control system as claimed in claim 9, wherein:
the electric motor comprises a direct-current brush motor.

* * * * *